(12) United States Patent
Groell

(10) Patent No.: US 8,474,150 B2
(45) Date of Patent: Jul. 2, 2013

(54) PROBE SYSTEM AND METHOD FOR OPERATING A PROBE SYSTEM

(75) Inventor: Klaus Groell, Waging am See (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 12/907,577

(22) Filed: Oct. 19, 2010

(65) Prior Publication Data
US 2011/0094117 A1   Apr. 28, 2011

(30) Foreign Application Priority Data

Oct. 28, 2009   (DE) .......................... 10 2009 046 071
Sep. 1, 2010    (DE) .......................... 10 2010 040 195

(51) Int. Cl.
*G01B 5/008* (2006.01)
*G01B 7/008* (2006.01)

(52) U.S. Cl.
USPC ................................. 33/558; 33/561; 33/503

(58) Field of Classification Search
USPC .......................................... 33/503, 558, 561
See application file for complete search history.

(56) References Cited

U.S. PATENT DOCUMENTS

| | | | |
|---|---|---|---|
| 5,056,235 A * | 10/1991 | Thomas .......................... 33/503 |
| 5,949,352 A * | 9/1999 | Ferrari ..................... 340/870.16 |
| 6,301,796 B1 * | 10/2001 | Cresson .......................... 33/556 |
| 6,526,670 B1 * | 3/2003 | Carli ................................ 33/503 |
| 6,839,563 B1 * | 1/2005 | Kirby et al. .................... 455/500 |
| 7,395,182 B2 | 7/2008 | Ferrari et al. |
| 7,546,690 B2 | 6/2009 | Groell et al. |
| 7,665,219 B2 | 2/2010 | Styles et al. |
| 8,082,674 B2 * | 12/2011 | Jordil et al. ..................... 33/558 |
| 2009/0049704 A1 * | 2/2009 | Styles et al. .................... 33/503 |
| 2009/0235547 A1 * | 9/2009 | Hellier ............................ 33/503 |

FOREIGN PATENT DOCUMENTS

| | | |
|---|---|---|
| DE | 10 2006 050 040 | 4/2008 |
| EP | 0 872 787 | 10/1998 |
| EP | 1 926 071 | 5/2008 |
| GB | 2 443 316 | 4/2008 |
| WO | WO 2007/028964 | 3/2007 |
| WO | 2009/027430 | 3/2009 |

OTHER PUBLICATIONS

European Search Report and Search Opinion, issued in corresponding European Patent Application No. 10175347.3.

* cited by examiner

*Primary Examiner* — Christopher Fulton
(74) *Attorney, Agent, or Firm* — Kenyon & Kenyon LLP

(57) ABSTRACT

A probe system includes a scanning head and a transceiver element. By touching a stylus, a sensor element is able to generate a sensor signal. The scanning head and the transceiver element are configured such that a wireless information transmission is able to be established between them. The probe contact information is able to be transmitted from the scanning head to the transceiver element by a first signal whose carrier wave is an optical wave, and furthermore, additional information is able to be transmitted between the scanning head and the transceiver element by an additional signal whose carrier wave is a radio wave.

18 Claims, 4 Drawing Sheets

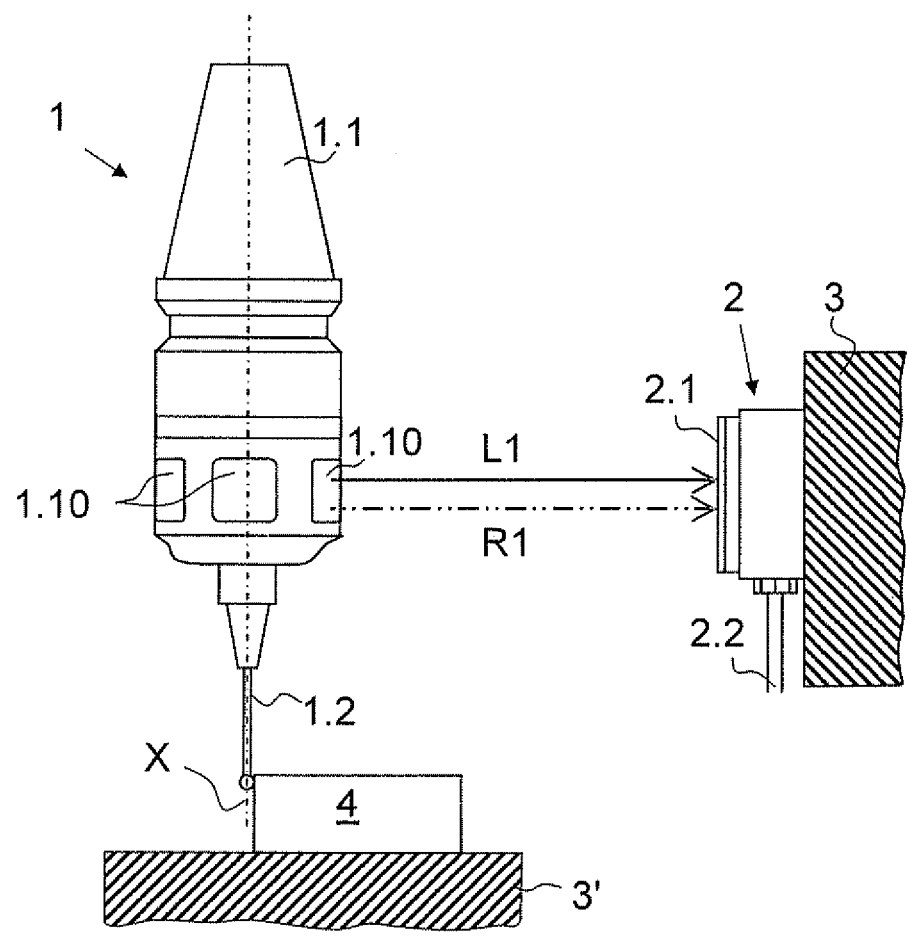

PROBE SYSTEM AND METHOD FOR OPERATING A PROBE SYSTEM

CROSS-REFERENCE TO RELATED APPLICATIONS

The present application claims priority to Application No. 10 2009 046 071.3, filed in the Federal Republic of Germany on Oct. 28, 2009, and to Application No. 10 2010 040 195.1, filed in the Federal Republic of Germany on Sep. 3, 2010, each of which is expressly incorporated herein in its entirety by reference thereto.

FIELD OF THE INVENTION

The present invention relates to a probe system, which is, e.g., made up of a scanning head having a stylus and a transceiver element, a wireless information transmission between the scanning head and the transceiver element being possible. Furthermore, the present invention relates to a method for operating such a probe system.

BACKGROUND INFORMATION

A probe system normally includes a mobile scanning head and a stationary transceiver element. The scanning head in the form of a momentary-contact switch has a deflectable stylus, which outputs a signal when deflected out of its rest position or when the stylus is contacted, and is used in particular for determining the position of workpieces which are clamped in machines, e.g., machine tools, that process material. In this context, the rest position of the stylus is understood to be a position in which the stylus has no contact with the workpiece to be probe-contacted. When the stylus is in contact with the workpiece, the stylus is deflected out of its rest position, and a suitable transducer generates an electrical sensor signal if the deflection exceeds a specified probe threshold. The electrical sensor signal then is often converted into an infrared signal, thereby achieving a contactless and wireless signal transmission to the transceiver element of the probe system.

The wirelessly transmitted signals are then reconverted into electrical signals in this transceiver element. The transceiver element of the probe system is connected to an evaluation unit, to which the electrical signals are relayed, then evaluated and ultimately made available for the control of the machine tool, for example. The position of the workpiece to be measured can then be determined there, based on the measured position of the machine tool part in question.

Using a corresponding scanning head, it is therefore possible to scan the contour of a workpiece, but also the contour of a tool. If a workpiece is scanned, the scanning head is usually situated so as to be movable relative to the transceiver element, and when a tool is scanned, the scanning head is usually immovably mounted relative to the transceiver element.

A scanning system is described, for example, in PCT International Published Patent Application No. WO 2007/028964, in which a wireless signal transmission, alternatively using infrared light or a radio transmission, is provided.

SUMMARY

Example embodiments of the present invention provide a probe system and a method for operating a probe system, which in general is suitable for achieving high measuring accuracy. Furthermore, example embodiments of the present invention make it possible to achieve a reliable and simple operation of a probe system.

According to example embodiments of the present invention, a probe system includes a scanning head which has a stylus and a sensor element. By touching the stylus, the sensor element is able to generate a sensor signal, which includes probe contact information, so that the sensor signal acts as carrier of the probe contact information. Furthermore, the probe system includes a transceiver element. The scanning head and the transceiver element are configured such that a wireless information transmission is able to be established between them. The probe contact information is transmittable from the scanning head to the transceiver element via a first signal, whose carrier wave is an optical wave. Moreover, additional information is transmittable between the scanning head and the transceiver element by an additional signal whose carrier wave is a radio wave.

The probe contact information provides information as to whether the stylus touches a body to be measured. Information that differs from this probe contact information is able to be provided as additional information.

In the following text, specifically signals that are present in the form of modulated optical waves should be understood as signals whose carrier waves are optical waves. Hereinafter, an electromagnetic wave that is located in a frequency band between 0.3 THz ($\lambda$=1 mm) and 30 PHz ($\lambda$=10 nm) should be understood as an optical wave. The optical wave lies, for example, within a frequency band of 100 THz ($\lambda$A=3 µm) to 1000 THz ($\lambda$=0.3 µm). The optical wave may be assigned to the infrared spectrum, in particular. Optoelectronic components, in particular, may be used for transmitting and receiving signals whose carrier waves are optical waves.

Signals which are present in the form of modulated radio waves should be understood as signals whose carrier waves are radio waves. Antenna systems may be used for transmitting and receiving signals whose carrier waves are radio waves. The preferred frequency band for radio waves lies between 0.3 MHz and 300 GHz, e.g., the radio wave has a frequency between 3 MHz and 30 GHz.

The scanning head may be arranged without sensors for optical waves, so that it is unable to receive any signals whose carrier waves are optical waves. Moreover, the scanning head may be configured such that it is able to transmit as well as receive radio waves. The transceiver element may be configured such that it is able to receive optical waves and transmit radio waves. More specifically, the transceiver element may be configured such that radio waves are able to be received in addition. Furthermore, the transceiver element may be arranged without a transmitter for optical waves, i.e., in mute form, so that it is unable to transmit any signals whose carrier waves are optical waves.

The sensor element may be arranged as a mechanically acting element, e.g., a strain gauge or a piezo element, or as an optically acting element, e.g., a photovoltaic element, in an optical system.

The further signal may be transmittable from the transceiver element to the scanning head. As an alternative or in addition, the further signal may be transmittable from the scanning head to the transceiver element. Moreover, during the transmission of a plurality of additional signals, these additional signals are able to be transmitted from the scanning head to the transceiver element, and from the transceiver element to the scanning head, the additional signals by definition not containing or carrying the probe contact information.

An additional signal, which contains or carries the probe contact information and whose carrier wave is a radio wave, may be transmitted from the scanning head to the transceiver element.

The probe contact information may be emitted, i.e., transmitted, from the scanning head to the transceiver element simultaneously or in parallel by the first signal and the additional signal. In this context, the probe system may also be configured such that the probe contact information is able to be output by the transceiver element to subsequent electronics as soon as either the first signal or the additional signal is conditioned for output in the transceiver element, depending on which one of the two signals is conditioned first or conditioned earlier for output, so that the signal conditioned for output first is able to be output with temporal priority.

An electronic unit, in particular, may be situated in the scanning head and/or the transceiver element, which determines time differences that are required for the electronic processing of the probe contact information in the scanning head and/or in the transceiver element. Based on these time differences, corresponding corrective time spans may then be output to subsequent electronics in order to optimize the measuring accuracy. The output of the corrective time spans is particularly advantageous when a data bus is used between the transceiver element and the subsequent electronics.

The probe system may be configured such that the transceiver element is able to output the probe contact information to subsequent electronics successively, one after the other, in redundant fashion. In particular, the probe contact information able to be output successively in redundant fashion may be based on the first signal on the one hand, and on the additional signal on the other hand.

As an alternative, the probe system may be configured such that the first signal and the additional signal are able to be received in the transceiver element and evaluated such that a check of the correct, redundant reception of the first signal and the additional signal is able to be performed. If the result of this check is positive, then confirming information, which confirms the correct transmission of the probe contact information, may be output to the subsequent electronics. That is to say, the transceiver element is able to output the probe contact information and the confirmation information to the subsequent electronics, in particular one after the other.

The probe system may be configured such that the transceiver element is able to output the probe contact information to subsequent electronics at a specified and in particular constant time offset.

According to an example embodiment of the present invention, a probe system includes: a scanning head including: a stylus; and a sensor configured to generate a sensor signal that includes probe contact information by contact of the stylus; and a transceiver. The scanning head and the transceiver are configured to communicate with each other by wireless information transmission. The scanning head is configured to transmit the probe contact information to the transceiver by a first signal having an optical carrier wave. Additional information is transmittable between the scanning head and the transceiver by an additional signal having a radio carrier wave.

The scanning head may not include an optical sensor.

The scanning head may be configured to transmit the additional signal to the transceiver.

The transceiver may be configured to transmit the additional signal to the scanning head.

The scanning head may be configured to transmit the additional signal to the transceiver, and the additional signal may include the probe contact information.

The scanning head may be configured to transmit the probe contact information to the transceiver simultaneously by the first signal and the additional signal.

The transceiver may be configured to output the probe contact information to subsequent electronics as soon as either the first signal or the additional signal is conditioned for output in the transceiver.

The transceiver may be configured to output the probe contact information and confirmation information to subsequent electronics.

The transceiver may be configured to output the probe contact information to subsequent electronics at a predefined time offset.

According to an example embodiment of the present invention, a method for operating a probe system including a scanning head and a transceiver, the scanning head having a stylus and a sensor, the sensor configured to generate a sensor signal including probe contact information by contact of the stylus, a wireless information transmission being established between the scanning head and the transceiver, includes: (a) transmitting the probe contact information from the scanning head to the transceiver by a first signal having an optical carrier wave; and (b) transmitting additional information between the scanning head and the transceiver by an additional signal having a radio carrier wave.

The transmitting (b) may include transmitting the additional signal from the scanning head to the transceiver.

The transmitting (b) may include transmitting the additional signal from the transceiver to the scanning head.

The additional signal may include the probe contact information, and the transmitting (b) may include transmitting by the scanning head to the transceiver element the additional signal including the probe contact information.

The transmitting (a) and the transmitting (b) may include simultaneously transmitting by the scanning head to the transceiver the probe contact information by the first signal and the additional signal.

The method may include outputting, by the transceiver to subsequent electronics, the probe contact information as soon as either the first signal or the additional signal is conditioned for output in the transceiver.

The method may include outputting, by the transceiver to subsequent electronics, the probe contact information and confirmation information.

The method may include outputting, by the transceiver to subsequent electronics, the probe contact information at a predefined time offset.

Further features and aspects of a probe system and a method according to example embodiments of the present invention are described in more detail below with reference to the appended Figures.

BRIEF DESCRIPTION OF THE DRAWINGS

FIG. 4 illustrates a probe system in a position in which a scanning head or its stylus contacts a workpiece.

DETAILED DESCRIPTION

Figure 1:
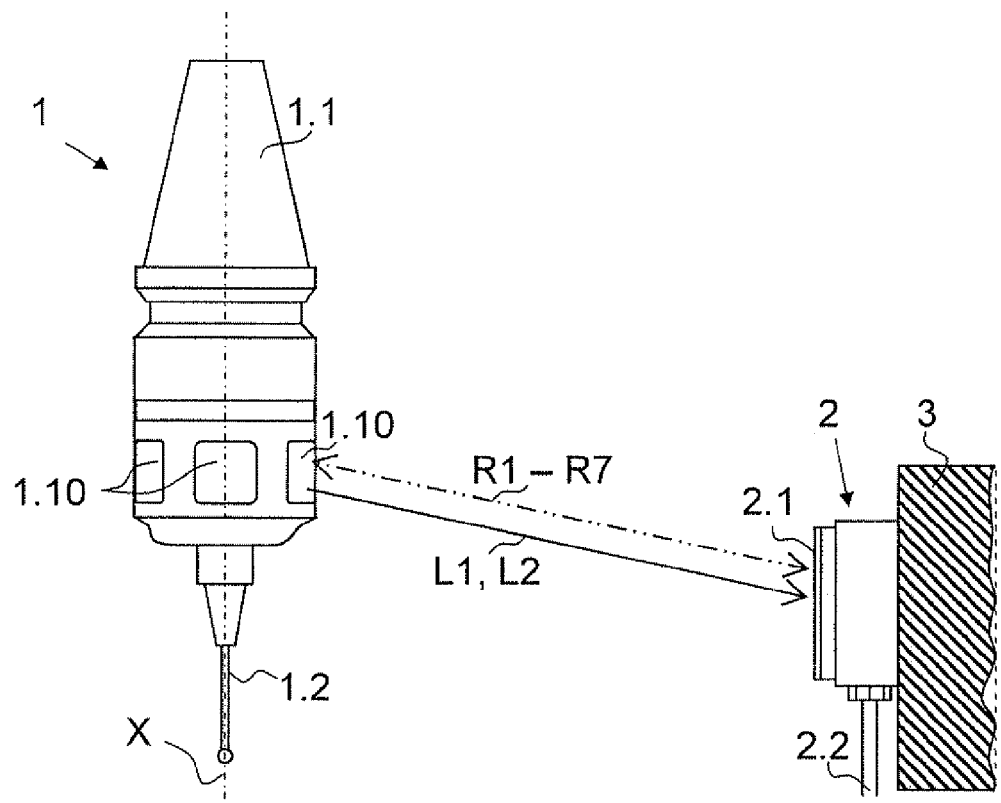
FIG. 1 is a side view of a probe system.

FIG. 1 shows a probe system which includes a scanning head 1 and a transceiver element 2. Scanning head 1 may be clamped into a spindle of a machine tool with the aid of a clamping cone 1.1. Longitudinal axis X of scanning head 1 simultaneously constitutes the center axis of clamping cone 1.1. Parallel and concentrically with respect to longitudinal axis X, a cylindrical stylus 1.2, which has a probe-contact sphere at one end, is provided on scanning head 1.

Figure 2:
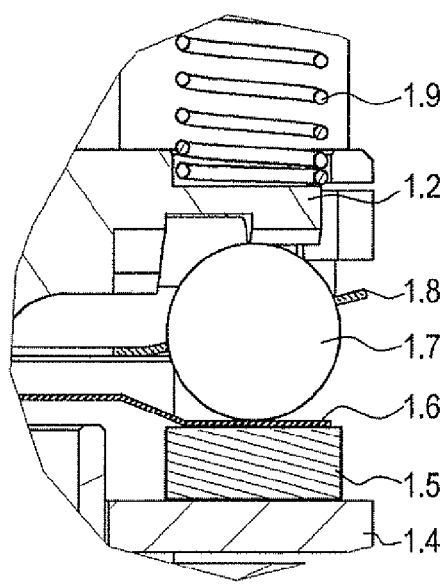
FIG. 2 is an enlarged view of a scanning head having a sensor element.

FIG. 2 shows a partial view of the interior of scanning head 1. Placed on a circuit board 1.4 are a total of three pressure-sensitive sensor elements 1.5, of which only one is shown in the view in FIG. 2. Disposed on the surface of each sensor element 1.5 is a diaphragm 1.6, which in each case is touched by a sphere 1.7, holder 1.8 accurately fixing spheres 1.7 in place in a predetermined position relative to sensor elements 1.5. An arm of stylus 1.2, prestressed in each case by a spring 1.9, rests on each sphere 1.7. A battery, not shown in the figures, is disposed in scanning head 1 in order to supply scanning head 1 with energy.

Figure 3A:
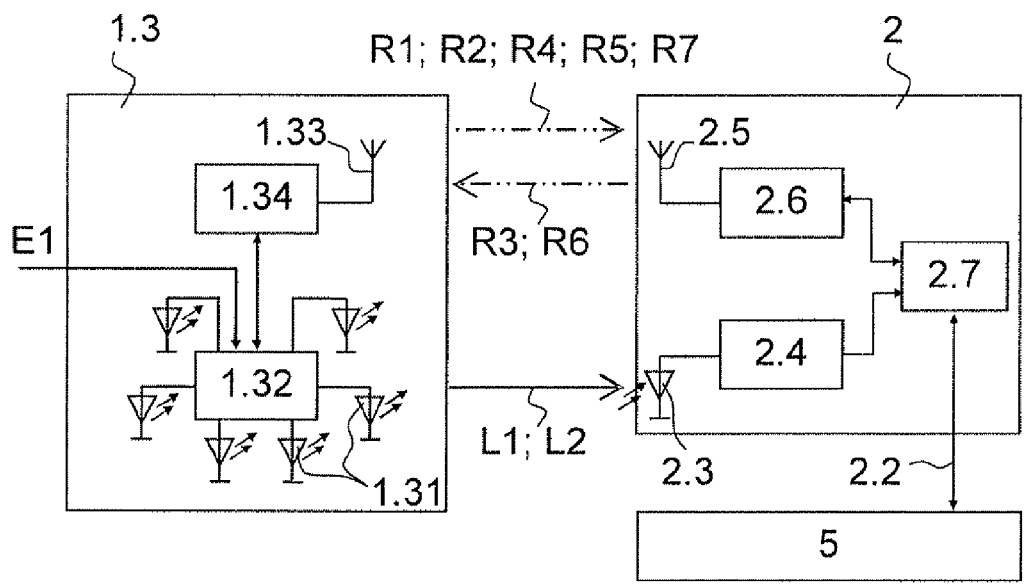
FIG. 3a is a schematic circuit diagram of a transceiver unit of a scanning head and a transceiver element.

Furthermore, scanning head 1 has windows 1.10, which are transmissive both by optical waves and radio waves. According to FIG. 3a, a transceiver unit 1.3 is disposed within scanning head 1. It includes light sources 1.31, which are supplied by the battery in scanning head 1 and are situated at an offset across the periphery of scanning head 1. In the example shown, six light sources 1.31 are provided on scanning head 1, each offset by 60° along a circumferential line on scanning head 1. As schematically illustrated in FIG. 3a, light sources 1.31 are controlled by a CPU 1.32 arranged in scanning head 1. Here, they are able to emit optical waves having a wavelength of, e.g., $\lambda_L$=880 nm, which corresponds to a frequency $f_L$ of approx. 340 THz. It should be mentioned that scanning head 1 does not include a sensor for optical waves, so that scanning head 1 is unable to receive signals based on optical waves.

In addition, a radio transceiver 1.34 having an antenna 1.33 is situated in scanning head 1. Antenna 1.33 is accommodated behind windows 1.10, for example, as circumferential wire in scanning head 1.

In the example shown, transceiver element 2 is fixed in place on a stationary component 3 of the machine tool and has a window 2.1, which is transmissive to optical waves and also by radio waves. Disposed behind this window are an optoelectronic receiver 2.3 and an additional radio transceiver 2.6 having an antenna 2.5 (cf. FIG. 3a). In addition, transceiver element 2 includes an analog-digital converter 2.4 and an integrated circuit 2.7, e.g., in the form of an FPGA element. As an alternative, a trigger circuit, e.g., having a controllable amplifier, also may be used in transceiver element 2.

For its power supply, transceiver element 2 is connected to the power supply system via a multicore cable 2.2. Moreover, via cable 2.2, transceiver element 2 is electrically connected to subsequent electronics 5, which may be a numerical control, for example, to the respective machine tool. According to example embodiments, a bidirectional data bus connection is established between transceiver element 2 and subsequent electronics 5.

In the exemplary embodiments shown, radio transceivers 1.34, 2.6 are able to emit and receive radio waves having a frequency, e.g., $f_R$=2.4 GHz ($\lambda_F$=12.5 cm).

Prior to the actual measuring operation, scanning head 1 is fixed in place in a spindle of a machine tool, for example, and then turned on. In so doing, radio transceiver 2.6 of transceiver element 2 emits an actuation signal R3 via antenna 2.5, which signal includes the actuation information and whose carrier wave is a radio wave. This actuation signal R3 is received via antenna 1.33 of scanning head 1 and processed further by radio transceiver 1.34. With the aid of CPU 1.32, the actuation information triggers the actuation, i.e., activation, of scanning head 1, so that the measuring operation is able to begin.

If scanning head 1 is put into operation for the first time, transceiver element 2 may query parameter information, especially type information, from scanning head 1. This information is transmitted from scanning head 1 to transceiver element 2 with the aid of a parameter signal R4, whose carrier wave is a radio wave. If appropriate, the type information is then forwarded to subsequent electronics 5, and a corresponding configuration of subsequent electronics 5 and/or transceiver element 2 takes place.

Furthermore, it may subsequently be checked whether scanning head 1 is authenticated for the operation, using transceiver element 2 mounted in the machine tool. Toward this end, a corresponding query is started via radio transceiver 2.6. This triggers the transmission of authentication information from scanning head 1 to transceiver element 2 with the aid of authentication signal R5, whose carrier wave is a radio wave. If this authentication information is successfully transmitted to transceiver element 2, i.e., if an operation authorization exists, it is forwarded to subsequent electronics 5, and if appropriate, certain control options for the machine tool may be enabled. A negative authentication notwithstanding, an operation of scanning head 1 in the probe system may be possible under certain circumstances, for instance while utilizing the mentioned control options on a fee basis.

Optionally, the probe system may also be configured such that three different modes are able to be set prior to the actual measuring operation. More particularly, following the actuation of transceiver element 2, the operator may choose whether the probe system is to be operated a) in a pure radio mode, b) in a pure IR mode, or c) in a hybrid mode.

In the radio mode according to option a), all information is transmitted from scanning head 1 to transceiver element 2 and vice versa, by signals whose carrier wave is a radio wave. This option may be chosen especially when, for example, the following application case will require high ranges for the signal transmission and/or when many scanning heads 1 are situated in a tight space.

The pure IR mode according to option b) is characterized by the fact that all information is transmitted from scanning head 1 to transceiver element 2 by signals whose carrier wave is an optical wave. For example, this option will be chosen when very high interference immunity with respect to radio waves is required and/or when a signal transmission that is minimized with regard to delays is most important.

Although the operation according to options a) and b) is based on only one type of carrier wave in each case, the probe system nevertheless is configured for transmitting signals via optical and radio waves.

In general, the probe system is operated according to hybrid mode c). This operating type forms the basis of the further description of the exemplary embodiments.

Each probe system is usually assigned one radio channel number, either manually or automatically, if, for example, a plurality of probe systems is operated in a machine shop in parallel. The probe system includes a transceiver element 2 and one or more scanning head(s) 1. Since always only one scanning head 1 is active at any given time when using a plurality of scanning heads 1, it is possible to assign one radio channel number per probe system or per transceiver element 2, so that the same radio channel number may be assigned to a plurality of scanning heads 1 within a probe system without any problems. The radio channel number may simultaneously be used as address for the transmission via the optical waves, which therefore allows an unambiguous assignment to the individually active scanning head 1 in connection with the transmission, which requires little outlay for devices and uses short addresses. For the sake of simplicity, a probe system that includes only one scanning head 1 will be described in the following text.

During the measuring operation, scanning head 1 is moved within a processing space of the machine tool or tilted about an axis that has an orthogonal orientation relative to longitudinal axis X. In the course of the measuring operation, radio transceiver 1.34 of scanning head 1 continuously transmits a ready signal R2 containing readiness information to transceiver element 2 in order to signal that the communication connection to scanning head 1 is working properly. The readiness information thus is transmitted by ready signal R2, whose carrier wave is a radio wave. Upon receipt of the readiness operation by transceiver element 2, the measuring operation is maintained. In the event that the correct transmission of ready signal R2 fails due to electromagnetic interference, for example, i.e., when an acknowledge report of transceiver element 2 fails to occur, for instance, then scanning head 1 also emits ready signal R2 as a further ready signal L2. However, further ready signal L2 is emitted by light sources 1.31, their carrier wave being an optical wave. If ready signal R2 or also only the further ready signal L2 is transmitted successfully, the measuring operation continues to be maintained. This effectively prevents an impairment of the measuring operation of the probe system, even in the presence of powerful electromagnetic interference effects.

As an alternative, it is also possible to transmit only the further ready signal L2, without redundant, radio-based transmission of the other ready signal R2.

FIG. 4 shows a situation in which stylus 1.2 is contacting a workpiece 4 which is secured on a mounting table 3' of the machine tool. In this situation, sensor elements 1.5 generate an electric sensor signal E1 at instant $t_0$, which correspondingly contains probe contact information. The occurrence of sensor signal E1 leads to the transmission of a first signal L1 and simultaneously of an additional signal R1, both of which also include the probe contact information.

Figure 5A:
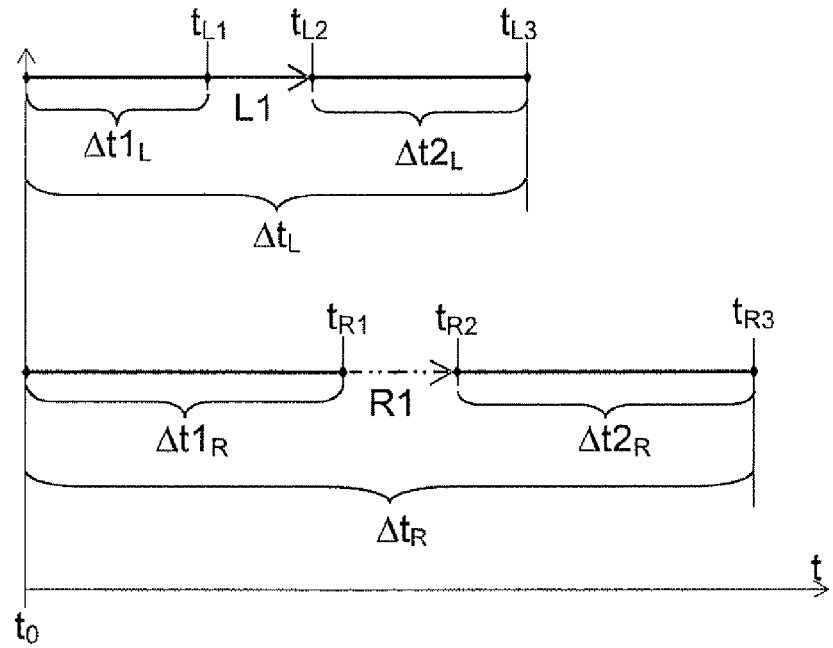
FIG. 5a is a timing diagram of a signal transmission and signal conditioning.
Figure 5B:
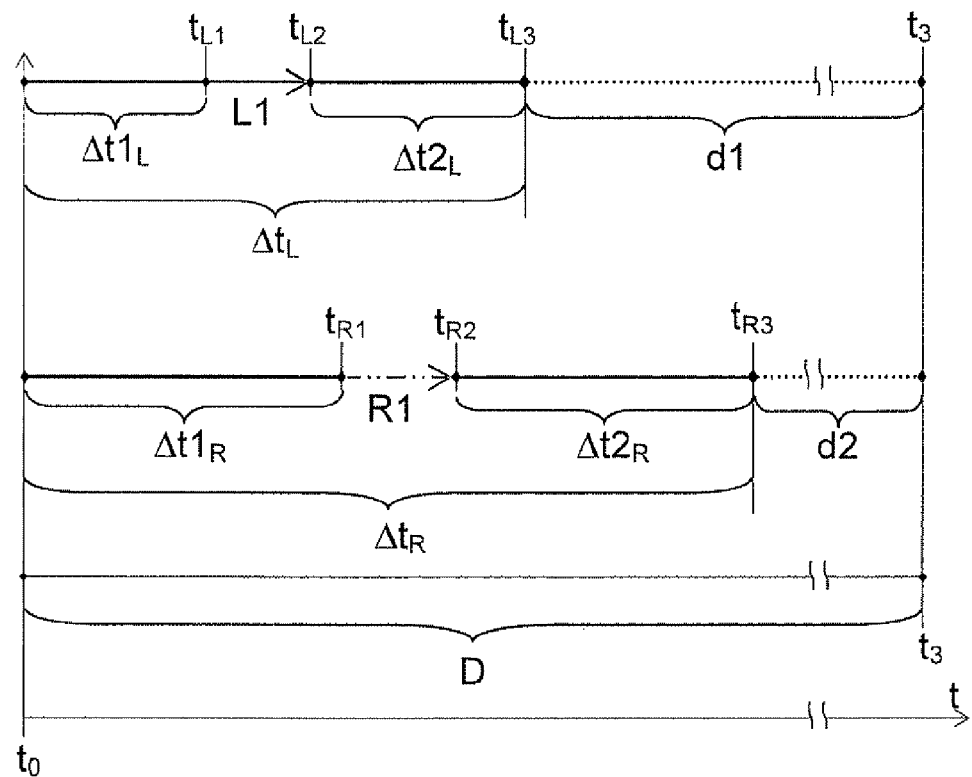
FIG. 5b is a timing diagram of a signal transmission and signal conditioning.

First signal L1 is emitted by light sources 1.31 at instant $t_{L1}$ (cf. FIG. 5a) and therefore has a carrier wave that is an optical wave. The probe contact information or first signal L1 is transmitted to transceiver element 2 and received by optoelectronic receiver 2.3 at instant $t_{L2}$. There, first signal L1 is converted into an electrical signal, which is digitized in analog-digital converter 2.4 and then forwarded to integrated circuit 2.7, so that the probe contact information is then conditioned for output to subsequent electronics 5 at instant $t_{L3}$ via cable 2.2. In a correct, i.e., faultless, information transmission via optical wave, approximately 0.2 ms elapse between instant $t_0$ of the probe scanning, and instant $t_{L3}$ when the probe scan information is output by transceiver element 2 to subsequent electronics 5 ($\Delta t_L = t_{L3} - t_0 \approx 0.2$ ms). In this context it must be taken into account that the time required by signal L1, and also by additional signal R1, on the way from scanning head 1 to transceiver element 2 is very brief and will not be considered further in the following. For these reasons alone, the time intervals have not been shown true to scale in FIGS. 5a and 5b.

Additional signal R1 is emitted by radio transceiver 1.34 in conjunction with antenna 1.33 of scanning head 1 at instant $t_{R1}$ and therefore has a carrier wave that is a radio wave. Hence, the probe contact information is transmitted to transceiver element 2 redundantly, by additional signal R1. In the case at hand, additional signal R1 is intercepted by antenna 2.5 at instant $t_{R2}$ and converted into a digital electrical signal by radio receiver 2.6. Subsequently, it is relayed to integrated circuit 2.7. As a rule, the transmission of the probe contact information by the radio waves altogether takes longer than via optical waves, in particular due to the different time requirements for the electronic further processing of the probe contact information. In the present example, a time interval $\Delta t_R$ of approximately 1 ms is required for transmitting the probe contact information via radio waves, starting from probe contact instant $t_0$ to instant $t_{R3}$, when transceiver element 2 outputs the probe contact information to subsequent electronics 5 ($\Delta t_R = t_{R3} - t_0 \approx 1$ ms). If electromagnetic interference hampers the transmission of additional signal R1, then the value of $\Delta t_R$ may also increase significantly.

As soon as the probe contact information has been transmitted to subsequent electronics 5, the position is determined at which the workpiece was contacted, and subsequent electronics 5 simultaneously triggers a stop of the machine tool, so that scanning head 1 is no longer moved relative to workpiece 4. Machine tools usually have precise measuring devices which determine the spindle position, so that these measured values are used for determining the contact position. Since $\Delta t_R$ is normally greater than $\Delta t_L$, the probe contact information transmitted via optical wave has thus already arrived at subsequent electronics 5 at instant $t_{R3}$. Therefore, the probe contact information that is transmitted via optical waves triggers the mentioned measures in subsequent electronics 5 in the illustrated example. Nevertheless, at instant $t_{R3}$, the probe contact information that is transmitted by additional signal R1 is once again output to subsequent electronics 5 in order to confirm that a probe contact process has actually taken place. Thus, the probe system is configured such that transceiver element 2 is able to output the probe contact information to subsequent electronics 5 successively in redundant fashion.

However, it may also happen that due to interference with regard to first signal L1, for example, a time interval $\Delta t_L^*$ occurs between instant $t_0$ of the probe contact and an instant $t_{L3}^*$ when transceiver element 2 outputs the probe contact information to subsequent electronics 5 that is greater than time interval $\Delta t_R$. Much more frequently it may also happen that the transmission of the probe contact information by the optical waves fails completely ($\Delta t_L^* \to \infty$). In this case the probe contact information transmitted via the radio waves may trigger the stop and the measurement. The probe contact information transmitted via the optical waves then acts as confirmation of the probe contact operation, as the case may be.

In order to increase the measuring precision, it is possible to record in transceiver element 2 instant $t_{L2}$ of the reception of first signal L1 and/or instant $t_{R2}$ of the reception of additional signal R1. Furthermore, the later instants $t_{L3}$ and/or $t_{R3}$ may be determined, at which the probe contact information is output to subsequent electronics 5 in each case. The information about the elapsed time $\Delta t2_L (= t_{L3} - t_{L2})$ between instant $t_{L2}$ of the receipt of first signal L1, and instant $t_{L3}$ of the output of the probe contact information by transceiver element 2 to subsequent electronics 5 may be output to subsequent electronics 5. In the same manner, the elapsed time $\Delta t2_R (= t_{R3} - t_{R2})$ between instant $t_{R2}$ of the receipt of additional signal R1, and instant $t_{R3}$ of the output of the probe contact information by transceiver element 2 to subsequent electronics 5 may be determined in addition or as an alternative. Elapsed times $\Delta t2_L$, $\Delta t2_R$ thus correspond to the times that are required for the electronic conditioning of the probe contact information in transceiver element 2 in each case.

The shorter one of the elapsed overall times $\Delta t_L$, $\Delta t_R$ is then used for determining the contact position, taking the traversing speed of scanning head 1 relative to workpiece 4 into account in the subsequent electronics.

Furthermore, to increase the measuring precision, scanning head 1 may be configured such that a time difference $\Delta t1_R$ is determined therein, which elapses between instant $t_0$ of the scanning (occurrence of sensor signal E1), and instant $t_{R1}$ of the output of additional signal R1 via antenna 1.33 ($\Delta t1_R = t_{R1} - t_0$). Time difference $\Delta t1_R$ thus corresponds to the time required for the electronic conditioning of the probe contact information in scanning head 1. Together with the probe contact information, the information regarding time difference $\Delta t1_R$ is transmitted to transceiver element 2 by a time-difference signal R7, whose carrier wave is a radio wave. This information based on time difference $\Delta t1_R$, which may be called corrective time interval $\Delta t_K$, is then finally also output to subsequent electronics 5 by transceiver element 2 and used when determining the contact position, taking the traversing speed into account.

For the transmission via optical waves, it is also possible to use an analog method to determine a time difference $\Delta t1_L$ for the electronic conditioning of the probe contact information in scanning head 1 and to transmit it via optical waves.

In order to optimize the energy consumption of scanning head 1, however, the determination of time difference $\Delta t1_L$ that elapses between instant $t_o$ of the probe contact (occurrence of sensor signal E1), and instant $t_{L1}$ when first signal L1 is output via light sources 1.33, may also be omitted. Thus, there is no need to transmit information regarding this time difference to transceiver element 2 by the optical waves, which has an advantageous effect in terms of energy. In such a case the measuring accuracy may nevertheless be increased quite successfully. Toward this end, a constant time difference $\Delta t_C$ is stored in transceiver element 2, which is used as the approximate time that is required for the electronic conditioning of the probe contact information in scanning head 1, provided the probe contact information is received via first signal L1.

As an alternative, in view of an optimized measuring operation, time difference $\Delta t1_L$ may also be transmitted to transceiver element 2 via optical wave. To reduce the information to be transmitted, it may initially be assumed that scanning head 1 must transmit a data frame having a defined, unvarying time length $\Delta t1_{LF}$ n times until a faultless reception has been achieved (n being a natural number $\geq 1$). Provided the time length $\Delta t1_{LF}$ is stored as a constant time in transceiver element 2 or in subsequent electronics 5, a time difference $\Delta t1_L$ is able to be determined there simply by transmitting number n, while taking the relationship $\Delta t1_L = n \cdot \Delta t1_{LF} + K$ into account, K being a predefined time constant. That is to say, the information about the number n is able to be transmitted via optical wave in such a case. The information regarding the values of K and $\Delta t1_{LF}$ is preferably transmitted when the connection between transceiver element 2 and scanning head 1 is established and subsequently remains stored in unchanged form in transceiver element 2 or in subsequent electronics 5 during the actual measuring operation.

As a result, it is possible for transceiver element 2 to output to subsequent electronics 5 information regarding the following corrective time intervals $\Delta t_K$ for correcting the contact position:

a) in the event that the probe contact information is transmitted via optical waves:

$$\Delta t_K = \Delta t_C; \text{ or } \Delta t_K = \Delta t1_L; \text{ or } \Delta t_K = \Delta t2_L; \text{ or}$$

$$\Delta t_K = \Delta t_C + \Delta t2_L; \text{ or } \Delta t_K = \Delta t1_L + \Delta t2_L;$$

b) in the event that the probe contact information is transmitted via radio waves:

$$\Delta t_K = \Delta t1_R; \text{ or } \Delta t_K = \Delta t2_R; \text{ or } \Delta t_K = \Delta t1_R + \Delta t2_R.$$

The scanning system is configured such that transceiver element 2 is able to output the probe contact information to subsequent electronics 5 as soon as either first signal L1 (if $\Delta t_L < \Delta t_R$) or additional signal R1 (if $\Delta t_L > \Delta t_R$) is conditioned for output in transceiver element 2. In particular, regardless of the particular magnitude of time differences $\Delta t_L$ and $\Delta t_R$, the following corrective time spans $\Delta t_K$ may be specified for the signal that triggers the stop:

$$\Delta t_L < \Delta t_R \Rightarrow \Delta t_K = \Delta t_C; \text{ or } \Delta t_K = \Delta t1_L; \text{ or } \Delta t_K = \Delta t2_L \text{ or}$$
$$\Delta t_K = \Delta t_C + t2_L \text{ or } \Delta t_K = \Delta t1_L + \Delta t2_L$$

$$\Delta t_L > \Delta t_R \Rightarrow \Delta t_K = \Delta t1_R; \text{ or } \Delta t_K = \Delta t2_R; \text{ or } \Delta t_K = \Delta t1_R + t2_R.$$

In the illustrated first exemplary embodiment, a separate electronic unit, which determines time differences $\Delta t1_L$, $\Delta t2_L$, $\Delta t1_R$, $\Delta t2_R$ that are required for the electronic processing of the probe contact information in scanning head 1 and in transceiver element 2, is therefore disposed in scanning head 1 and in transceiver element 2. Based on at least one of these time differences $\Delta t1_L$, $\Delta t2_L$, $\Delta t1_R$, $\Delta t2_R$, a corresponding corrective time span $\Delta t_K$ is then output to subsequent electronics 5 for optimizing the measuring precision. The output of the corrective time span $\Delta t_K$ is advantageous in particular when a data bus is used between transceiver element 2 and subsequent electronics 5.

In the event that the transmission of the probe contact information via optical waves fails, for instance due to an opaque obstacle in the path of first signal L1, then the arrival of the probe contact information via the other manner of the radio waves triggers a stop of the machine tool.

Figure 3B:
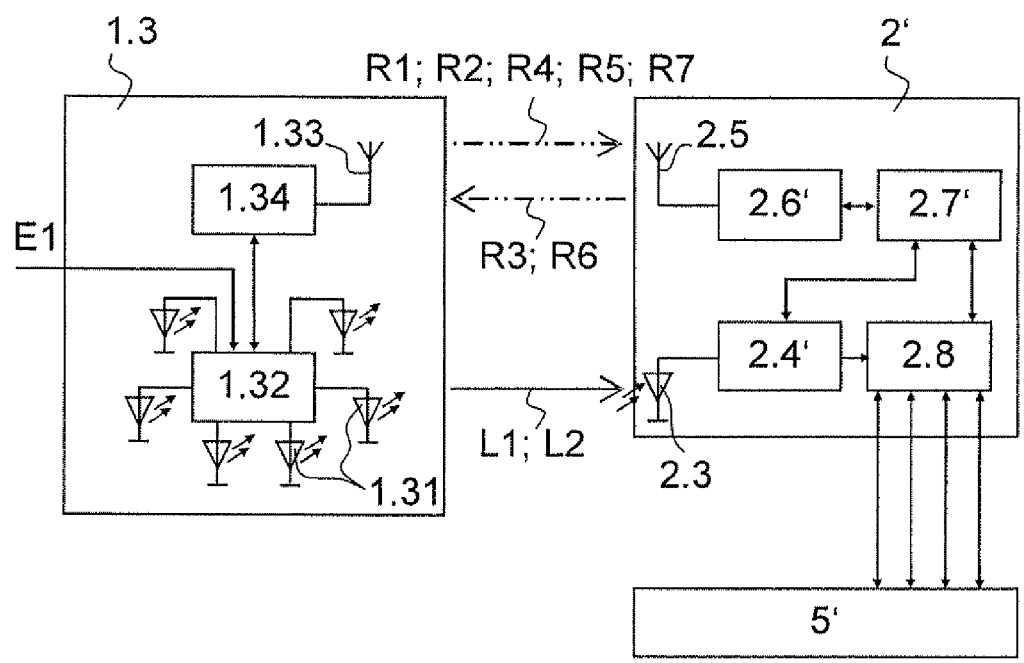
FIG. 3b is a schematic circuit diagram of a transceiver unit of a scanning head and a transceiver element.

According to example embodiments (see, e.g., FIGS. 3b and 5b), transceiver element 2' is modified and additionally provided with a latch 2.8. Such a transceiver element 2' may be employed when there is no data bus connection between transceiver element 2' and subsequent electronics 5'. This example embodiment differs from the above-described embodiment in that, among other things, the output of the probe contact information to subsequent electronics 5' takes place in a time-delayed manner, using a constant predefined time offset D. Similar to the first exemplary embodiment, time differences $\Delta t_L$ and $\Delta t_R$ are determined, and delay values d1 and d2 are calculated according to the relationships d1=D−$\Delta t_L$ and/or d2=D−$\Delta t_R$.

In the second exemplary embodiment as well, a separate electronic unit is therefore disposed in the scanning head and in the transceiver element, which determines time differences $\Delta t1_L$, $\Delta t2_L$, $\Delta t1_R$, $\Delta t2_R$ required for the processing of the probe contact information in scanning head 1 and in transceiver element 2.

Time offset D may be predefined as 10 ms, for example. Following this time, the probe contact information is forwarded to subsequent electronics 5', so that time offset D stored in subsequent electronics 5' together with the traversing speed is used when determining the contact position. It is irrelevant in this context whether the probe contact information is received in transceiver element 2' via an optical wave or via a radio wave, that is to say, via first signal L1 or additional signal R2. Thus, a corrective time span $\Delta t_K' = D$ is provided in the second exemplary embodiment; as already mentioned, the time intervals which signal L1 or additional signal R1 requires on the path from scanning head 1 to transceiver element 2, are disregarded in a good approximation.

The following table shows a summary of the transmission options according to the exemplary embodiments, the direction 1→2 denoting a transmission from scanning head 1 to transceiver element 2, and 2→1 correspondingly denoting the reverse transmission direction.

| signal | information | direction | carrier wave |
|---|---|---|---|
| L1 | probe contact information | 1 → 2 | optical wave |
| R1 | probe contact information | 1 → 2 | radio wave |
| L2 | readiness information | 1 → 2 | optical wave |
| R2 | readiness information | 1 → 2 | radio wave |
| R3 | actuation information | 2 → 1 | radio wave |
| R4 | parameter information | 1 → 2 | radio wave |
| R5 | authentication information | 1 → 2 | radio wave |
| R6 | setting information | 2 → 1 | radio wave |
| R7 | corrective time span | 1 → 2 | radio wave |

What is claimed is:

1. A probe system, comprising:
a scanning head including:
a stylus; and
a sensor configured to generate a sensor signal that includes probe contact information by contact of the stylus;
a transceiver;
wherein the scanning head and the transceiver are configured to communicate with each other by wireless information transmission;
wherein the scanning head is configured to transmit the probe contact information to the transceiver by a first signal having an optical carrier wave; and
wherein additional information is transmittable between the scanning head and the transceiver by an additional signal having a radio carrier wave.

2. The probe system according to claim 1, wherein the scanning head does not include an optical sensor.

3. The probe system according to claim 1, wherein the scanning head is configured to transmit the additional signal to the transceiver.

4. The probe system according to claim 1, wherein the transceiver is configured to transmit the additional signal to the scanning head.

5. The probe system according to claim 1, wherein the scanning head is configured to transmit the additional signal to the transceiver, the additional signal including the probe contact information.

6. The probe system according to claim 5, wherein the scanning head is configured to transmit the probe contact information to the transceiver simultaneously by the first signal and the additional signal.

7. The probe system according to claim 5, wherein the transceiver is configured to output the probe contact information to subsequent electronics as soon as either the first signal or the additional signal is conditioned for output in the transceiver.

8. The probe system according to claim 5, wherein the transceiver is configured to output the probe contact information and confirmation information to subsequent electronics.

9. The probe system according to claim 1, wherein the transceiver is configured to output the probe contact information to subsequent electronics at a predefined time offset.

10. A method for operating a probe system according to claim 1, comprising:
(a) transmitting the probe contact information from the scanning head to the transceiver by a first signal having an optical carrier wave; and
(b) transmitting additional information between the scanning head and the transceiver by an additional signal having a radio carrier wave.

11. A method for operating a probe system including a scanning head and a transceiver, the scanning head having a stylus and a sensor, the sensor configured to generate a sensor signal including probe contact information by contact of the stylus, a wireless information transmission being established between the scanning head and the transceiver, comprising:
(a) transmitting the probe contact information from the scanning head to the transceiver by a first signal having an optical carrier wave; and
(b) transmitting additional information between the scanning head and the transceiver by an additional signal having a radio carrier wave.

12. The method according to claim 11, wherein the transmitting (b) includes transmitting the additional signal from the scanning head to the transceiver.

13. The method according to claim 11, wherein the transmitting (b) includes transmitting the additional signal from the transceiver to the scanning head.

14. The method according to claim 11, wherein the additional signal includes the probe contact information, the transmitting (b) including transmitting by the scanning head to the transceiver element the additional signal including the probe contact information.

15. The method according to claim 14, wherein the transmitting (a) and the transmitting (b) includes simultaneously transmitting by the scanning head to the transceiver the probe contact information by the first signal and the additional signal.

16. The method according to claim 14, further comprising outputting, by the transceiver to subsequent electronics, the probe contact information as soon as either the first signal or the additional signal is conditioned for output in the transceiver.

17. The method according to claim 14, further comprising outputting, by the transceiver to subsequent electronics, the probe contact information and confirmation information.

18. The method according to claim 11, further comprising outputting, by the transceiver to subsequent electronics, the probe contact information at a predefined time offset.

\* \* \* \* \*